(12) United States Patent
Liu et al.

(10) Patent No.: US 12,554,433 B2
(45) Date of Patent: Feb. 17, 2026

(54) MEMORY DEVICE

(71) Applicant: Taiwan Semiconductor Manufacturing Company, Ltd., Hsinchu (TW)

(72) Inventors: Jen-Chieh Liu, Hsinchu (TW); Hung-Li Chiang, Taipei (TW); Jui-Jen Wu, Hsinchu (TW); Win-San Khwa, Taipei (TW); Yi-Lun Lu, New Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 151 days.

(21) Appl. No.: 18/519,051

(22) Filed: Nov. 26, 2023

(65) Prior Publication Data
US 2025/0173086 A1    May 29, 2025

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673

USPC .......................................................... 365/51
See application file for complete search history.

(56) References Cited

U.S. PATENT DOCUMENTS

| | | | |
|---|---|---|---|
| 2011/0007557 A1* | 1/2011 | Niki | G11C 11/412 365/154 |
| 2020/0160909 A1* | 5/2020 | Kuo | G11C 7/065 |
| 2023/0134533 A1* | 5/2023 | Park | H10B 61/22 257/427 |
| 2023/0164975 A1* | 5/2023 | Chiang | H10B 12/50 257/296 |
| 2023/0317132 A1* | 10/2023 | Liu | G11C 11/405 |

\* cited by examiner

*Primary Examiner* — Ly D Pham
(74) *Attorney, Agent, or Firm* — JCIPRNET

(57) ABSTRACT

A memory device is provided. The memory device includes: a write transistor, with a gate terminal connected to a write word line, and having a first source/drain terminal connected to a bit line; a storage transistor, with a gate terminal coupled to a second source/drain terminal of the write transistor to form a storage node, and having a first source/drain terminal connected to a source line; and a read transistor, with a gate terminal coupled to a read word line, and having a first source/drain terminal connected to the bit line. The read transistor and the storage transistor share a second source/drain terminal.

19 Claims, 6 Drawing Sheets

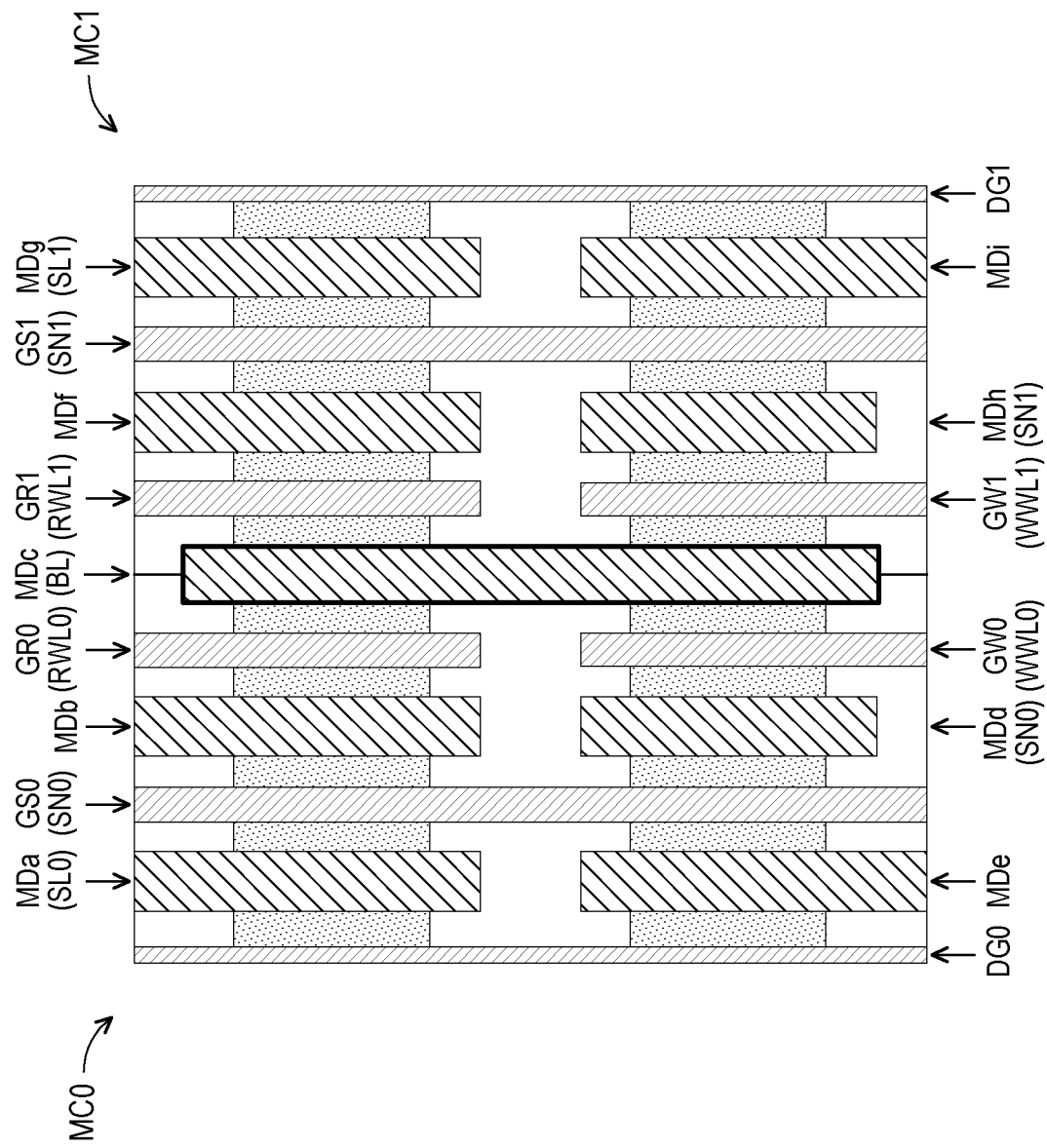

MEMORY DEVICE

BACKGROUND

In artificial intelligence (AI) applications, processors elements (PEs) designed for specialized tasks and operated at much faster speed are required. These PEs include logic circuits and memory devices. In order to reduce delay in communication between the logic circuits and the memory devices, the memory devices may be arranged very close to the logic circuits. Static random access memory (SRAM) is featured in high operation speed, and SRAM and the logic circuits are both formed of CMOS circuits. These allow SRAM being a suitable candidate for the memory devices. However, as compared to other memories, SRAM includes more transistors in each cell (e.g., 6 transistors or more). Further, layout design rule of SRAM is different from layout design rule of the logic circuits, and a dummy region is required to separate SRAM from the logic circuits. Therefore, SRAM requires large area overhead. Consequently, further increasing storage capacity of the memory devices is limited.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3C is a layout diagram illustrating an alternative layout of the neighboring memory cells of the memory device shown in FIG. 1, according to further embodiments of the present disclosure.

DETAILED DESCRIPTION

Figure 1:
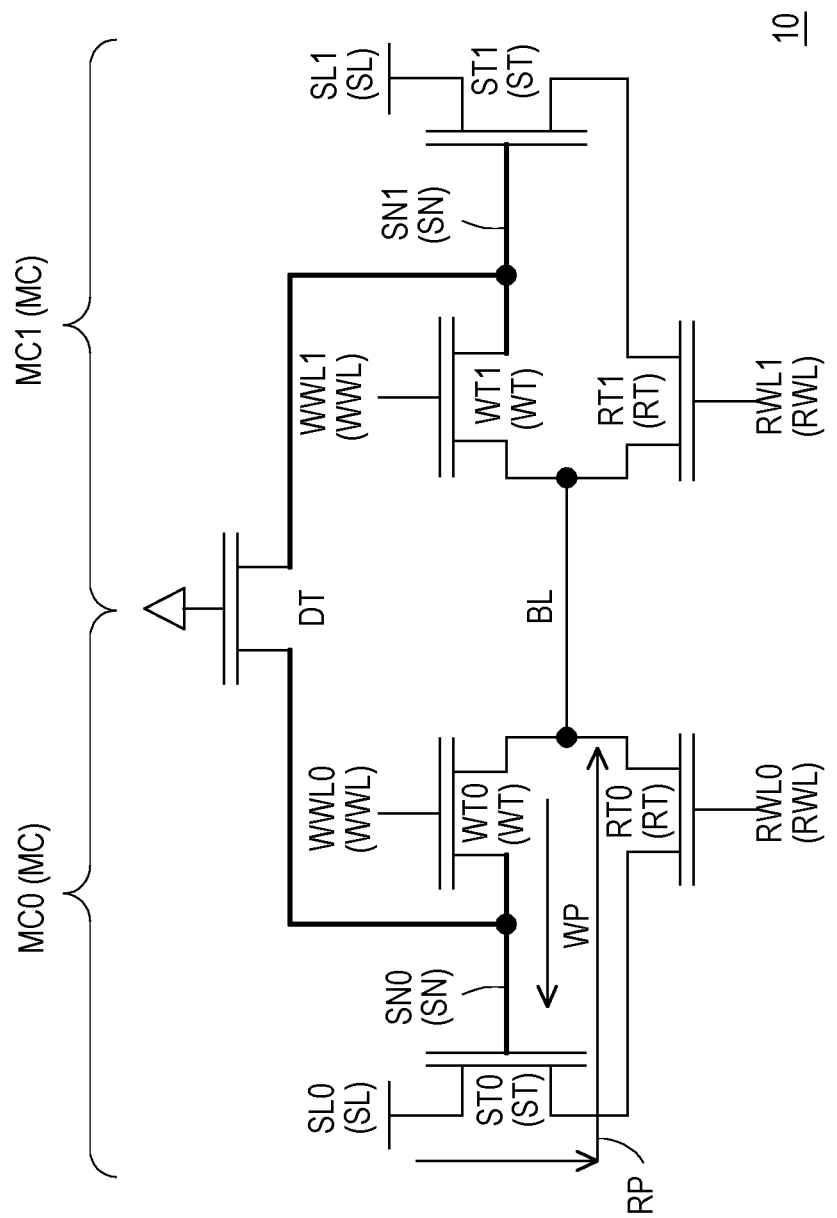
FIG. 1 is a circuit diagram illustrating neighboring memory cells in a memory device, according to some embodiments of the present disclosure.

The following disclosure provides many different embodiments or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides a logic-compatible memory device with improved area efficiency, as compared to SRAM.

FIG. 1 is a circuit diagram illustrating neighboring memory cells MC0, MC1 in a memory device 10, according to some embodiments of the present disclosure.

As will be described in greater details, data written to a storage node in each memory cell of the memory device 10 can be amplified by driving a current through a bit line. Therefore, the memory device 10 is also referred to as a gain cell memory. Further, each cell in the memory device 10 is formed by interconnected metal-oxide-semiconductor field effect transistors (MOSFETs), as similar to any logic cell. Therefore, the memory device 10 can be deployed next to logic cells, thus is logic-compatible.

The memory device 10 includes an array of memory cells MC. Among these memory cells MC, two neighboring memory cells MC0, MC1 are shown in FIG. 1. Each memory cell MC includes a write transistor WT, a read transistor RT and a storage transistor ST. The write transistor WT controls a write path WP to a gate terminal of the storage transistor ST, which is functioned as a storage node SN. To be more specific, a gate terminal of the write transistor WT is served as or connected to a write word line WWL, and a source/drain terminal of the write transistor WT is connected to a bit line BL. In addition, the other source/drain terminal of the write transistor WT is connected to the gate terminal of the storage transistor ST functioned as the storage node SN. In this way, the write path WP may be established from the bit line BL to the storage node SN when the write word line WWL is asserted, and a write voltage can be provided to the storage node SN from the bit line BL. On the other hand, when the write word line WWL is not asserted, the write path WP may be cut off, and the storage node SN is decoupled from the bit line BL.

In addition, the read transistor RT controls a read path RP passing a channel region across source/drain terminals of the storage transistor ST. Data stored at the storage node SN may be read out by sensing current passing through the read path RP. To be more specific, a gate terminal of the read transistor RT is served as or connected to a read word line RWL, and a source/drain terminal of the read transistor RT shared with the write transistor WT is connected to the bit line BL. In addition, the other source/drain terminal of the read transistor RT is connected to one of the source/drain terminals of the storage transistor ST, while the other source/drain terminal of the storage transistor ST is connected to a source line SL coupled to a fixed voltage (e.g., a ground voltage or a power supply voltage). In this way, a read voltage can be provided to one of the source/drain terminals of the storage transistor ST from the bit line BL, if the read word line RWL is asserted. Otherwise, the read voltage provided by the bit line BL is decoupled from the one of the source/drain terminals of the storage transistor ST. Further, whether a conduction channel can be formed across the source/drain terminals of the storage transistor ST depends on the data stored at the storage node SN. If the storage transistor ST is turned on and its conduction channel is established, the read voltage provided to one of the source/drain terminals of the storage transistor ST from the bit line BL (if so) may be pulled by the fixed voltage coupled to the source line SL. If the storage transistor ST is in an off state, the conduction channel may be absent, and the read voltage provided by the bit line BL may not be affected by the fixed voltage. Therefore, the data stored at the storage node SN can be indicated by voltage variation on the bit line BL, and can be read out by sensing current passing along the bit line BL. As the storage transistor ST can amplify the data stored at the storage node SN by driving the current on the bit line BL, each memory cell MC can be referred to as a gain cell, and the memory device 10 can be referred to as a gain cell memory.

As described, data is stored at the gate terminal of the storage transistor ST. Specifically, the data is stored in storage capacitors defined between the gate terminal of the storage transistor ST and surrounding conductive and/or semi-conductive elements. These storage capacitors may include a parasitic capacitor defined between the gate terminal of the storage transistor ST and an underlying semiconductor substrate that might have a bulk terminal coupled to a reference voltage (e.g., a ground voltage). According to some embodiments, these storage capacitors further include a gate capacitor in a dummy transistor DT. In these embodiments, the gate terminal of the storage transistor ST (i.e., the storage node SN) is coupled to a source/drain terminal of the dummy transistor DT, which is coupled to a gate terminal of the dummy transistor DT through the gate capacitor. As the gate terminal of the dummy transistor DT may be coupled to the reference voltage (e.g., a ground voltage) also provided to the bulk terminal of the semiconductor substrate, the dummy transistor DT may be kept in an off state, and the gate capacitor of the dummy transistor DT may be in parallel connection with the parasitic capacitor defined between the gate terminal of the storage transistor ST and the semiconductor substrate. An equivalent capacitance of capacitors connected in parallel is a sum of individual capacitances of the capacitors. Therefore, by further disposing the dummy transistor DT, an equivalent capacitance of the storage capacitors is increased. As a result, data retention at the storage node SN can be improved.

In some embodiments, neighboring memory cells MC have respective write transistors WT controlled by respective write word lines WWL; respective read transistors RT controlled by respective read word lines RWL; and respective storage transistors ST coupled to respective storage nodes SN and respective source lines SL. On the other hand, neighboring memory cells MC may share a co-defined dummy transistor DT, and may be connected to the same bit line BL. As an example, the memory cell MC0 includes a write transistor WT0 controlled by a write word line WWL0; a read transistor RT0 controlled by a read word line RWL0; and a storage transistor ST0 coupled to a storage node SN0 as well as a source line SL0. Meanwhile, the memory cell MC1 includes a write transistor WT1 controlled by a write word line WWL1; a read transistor RT1 controlled by a read word line RWL1; and a storage transistor ST1 coupled to a storage node SN1 as well as a source line SL1. On the other hand, the memory cells MC0, MC1 may share a co-defined dummy transistor DT, and are connected to the same bit line BL. Specifically, the source/drain terminals of the dummy transistors DT are defined by the storage nodes SN0, SN1 of the memory cells MC0, MC1, respectively. Since the dummy transistor DT is kept off by the reference voltage provided to the gate terminal of the dummy transistor DT, the storage nodes SN0, SN1 can be properly isolated from each other. Also, as will be further described, footprint area of each memory cell MC can be reduced by sharing a dummy transistor DT with an adjacent memory cell MC. In addition, the shared bit line BL is connected to a common source/drain terminal of the write transistor WT0 and the read transistor RT0, and connected to a common source/drain terminal of the write transistor WT1 and the read transistor RT1.

Figure 2A:
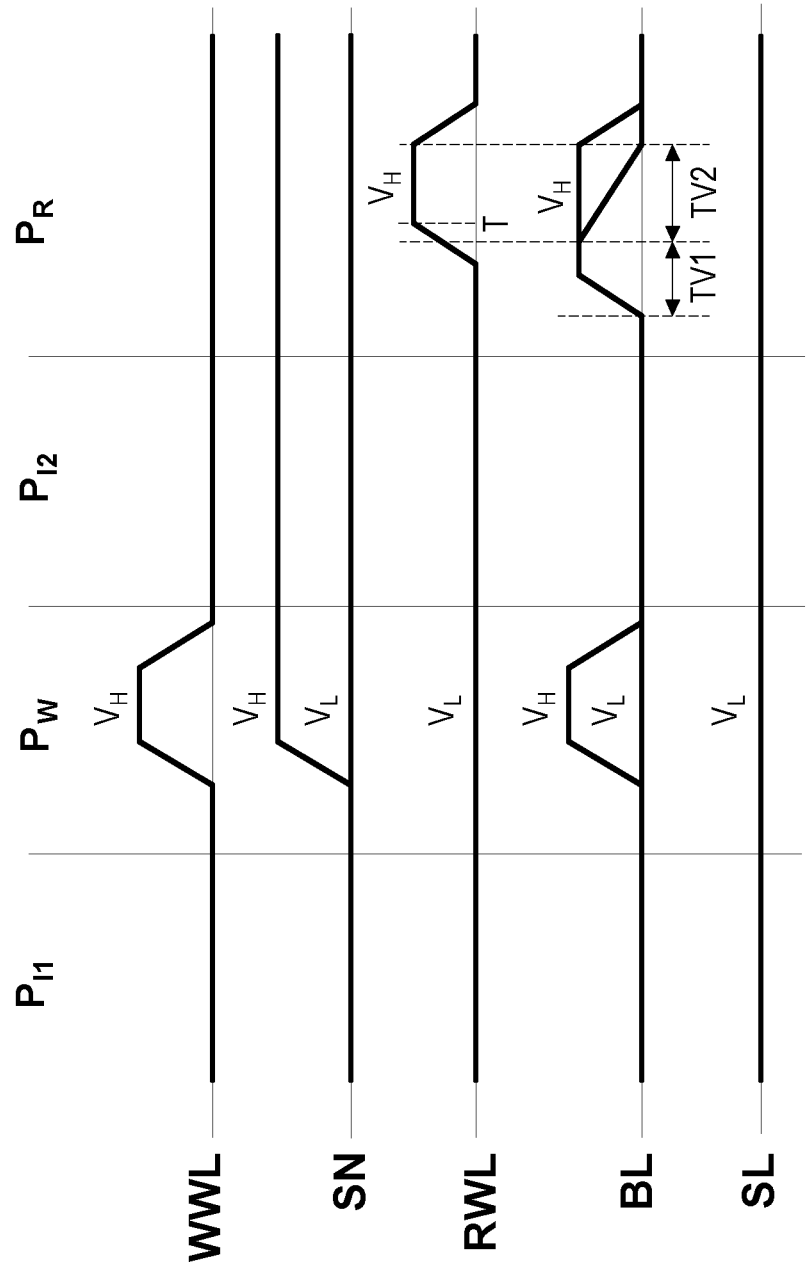
FIG. 2A is a timing diagram illustrating an operation scheme of each memory cell in the memory device shown in FIG. 1, according to some embodiments of the present disclosure.

FIG. 2A is a timing diagram illustrating an operation scheme of each memory cell MC in the memory device 10, according to some embodiments of the present disclosure.

Referring to FIG. 2A, an operation cycle for each memory cell MC may include a write operation $P_W$ and a following read operation $P_R$. Optionally, each operation cycle may further include an idle phase $P_{11}$ prior to the write operation $P_W$ and an idle phase $P_{12}$ in between the write operation $P_W$ and the read operation $P_R$. In embodiments where each memory cell MC is formed of interconnected NMOS, each NMOS can be turned on by providing a logic high voltage $V_H$ to its gate terminal, and can be kept in an off state when a logic low voltage $V_L$ is provided to its gate terminal. The operation cycle will be explained according to these embodiments.

During the idle phase $P_{11}$ prior to the write operation PW, the write word line WWL and the read word line RWL may be each coupled to the logic low voltage $V_L$, to ensure that the write transistor WT and the read transistor RT are both in an off state, so as to ensure cut-off of the write path WP and the read path RP. In addition, the bit line BL and the source line SL may also be coupled to the logic low voltage $V_L$. Further, as being decoupled from the bit line BL and the source line SL, the storage node SN is floated, and is dependent from the write operation $P_W$ in the previous operation cycle. As an example shown in FIG. 2A, if the storage node SN was written with the logic low voltage $V_L$ in the previous writing operation $P_W$, then the storage node SN may be kept at or close to the logic low voltage $V_L$.

During the subsequent write operation $P_W$, a pulse of the logic high voltage $V_H$ is provided to the write word line WWL, to turn on the write transistor WT. If a logic high data "1" is instructed to be programmed to the storage node SN, a pulse of the logic high voltage $V_H$ may be provided to the bit line BL when the write word line WWL is asserted. Accordingly, the logic high voltage $V_H$ on the bit line BL can be passed to the storage node SN through a conduction channel of the write transistor WT (i.e., along the write path WP), and the logic high data "1" can be written to the storage node SN. At an end of the pulse provided to the write word line WWL, the write transistor WT is turned off, and the conduction channel between the bit line BL and the storage node SN is cut off. Therefore, the storage node SN is decoupled from the bit line BL. Even if the bit line BL is pulled down at the same time as the write word line WL, the logic high voltage $V_H$ (i.e., the logic high data "1") provided to the storage node SN can be kept at the storage node SN. On the other hand, if a logic low data "0" is instructed to be programmed to the storage node SN, the bit line BL is coupled to the logic low voltage $V_L$, and the logic low voltage $V_L$ can be passed to the storage node SN through the conduction channel of the write transistor WT. When the write transistor WT is turned off at the end of the pulse of the logic high voltage $V_H$ on the write word line WWL, the storage node SN is decoupled from the bit line BL, and the logic low voltage $V_L$ is remained at the storage node SN as the logic low data "0".

Despite that the read operation $P_R$ as will be further described is non-destructive, the read operation $P_R$ may be separated from the write operation $P_W$. That is, the read path RP may be cut off during the write operation $P_W$. Specifically, the read word line RWL may be kept at the logic low voltage $V_L$ during the write operation $P_W$, to keep the read transistor RT in an off state, so as to ensure cut-off of the read path RP. In addition, according to some embodiments, the source line SL is also coupled to the logic low voltage $V_L$ during the write operation $P_W$.

The idle phase $P_{12}$ following the write operation $P_W$ is substantially identical with the idle phase $P_{11}$ prior to the write operation $P_W$. During the idle phase $P_{12}$, the write word line WWL and the read word line RWL may be both coupled to the logic low voltage $V_L$, to ensure that the write transistor WT and the read transistor RT are both in an off state, so as to ensure cut-off of the write path WP and the read path RP. In addition, the bit line BL may also be coupled to the logic low voltage $V_L$, and the source line SL may remain the same as in the write operation $P_W$ (e.g., remained coupled to the logic low voltage $V_L$). Further, as being decoupled from the bit line BL and the source line SL, the storage node SN is floated, and is dependent from the previous write operation $P_W$.

During the read operation $P_R$, a pulse of the logic high voltage $V_H$ is provided to the read word line RWL, to turn on the read transistor RT. In addition, while the source line SL may remain the same as in the previous stage (e.g., remain coupled to the logic low voltage $V_L$), the bit line BL is pre-charged to the logic high voltage $V_H$ before the read transistor RT is turned on. According to some embodiments, the bit line BL is pre-charged to the logic high voltage $V_H$ in a time interval TV1 before the read word line RWL is pulled up to the logic high voltage $V_H$. As an example, the time interval TV1 may be prior to a time T at which the read word line RWL is pulled up to the logic high voltage $V_H$. As the read transistor RT is turned on, whether the bit line BL can be coupled to the source line SL depends on the data currently stored at the storage node SN. Specifically, if the logic high data "1" corresponding to the logic high voltage $V_H$ was written to the storage node SN, the conduction channel of the read transistor RT is established, and the bit line BL is coupled to the source line SL in a time interval TV2 following the time interval TV1. In those embodiments where the source line SL is coupled to the logic low voltage $V_L$, the bit line BL precharged to the logic high voltage $V_H$ is discharged by the source line SL in the time interval TV2. On the other hand, if the logic low data "0" corresponding to the logic low voltage $V_L$ was written to the storage node SN, such conduction channel may be absent, and the bit line BL is not coupled to the source line SL, thus would not be pulled by the source line SL in the time interval TV2. In this way, by sensing current passing along the bit line BL in the time interval TV2, the data stored at the storage node SN can be read out.

As the read path RP does not pass through a gate capacitor of the storage transistor ST with an electrode defined by the storage node SN, read current passing along the read path RP would not charge or discharge the storage node SN. Therefore, the read operation $P_R$ is non-destructive, and the data stored at the storage node SN may not be affected by the read operation $P_R$. Accordingly, an additional write operation following the read operation $P_R$ to write back the stored data is not required.

At the end of the pulse provided to the read word line RWL during the read operation $P_R$, the read transistor RT is turned off, and the bit line BL is decoupled from the source line SL. Meanwhile, the bit line BL may be coupled to the logic low voltage $V_L$. If the bit line BL has not been pulled down by the source line SL in the time interval TV2, the bit line BL may be eventually pulled down after the time interval TV2. In addition, during the read operation $P_R$, the write word line WWL remains coupled to the logic low voltage $V_L$, to keep the write transistor WT off, and to ensure cut-off of the write path WP.

Up to here, a single operation cycle for each memory cell MC has been described according to the embodiments that the write transistor WT, the read transistor RT and the storage transistor ST are respectively implemented by an NMOS. In these embodiments, the dummy transistor DT may also be implemented by an NMOS, and the gate terminal of the dummy transistor DT may be coupled to the logic low voltage $V_L$ the entire time, to keep the dummy transistor DT off. It should be appreciated that, the operation scheme can be applied to embodiments that the write transistor WT, the read transistor RT, the storage transistor ST and the dummy transistor DT are respectively formed of a P-type MOSFET (PMOS), if signal polarity is reversed.

Figure 2B:
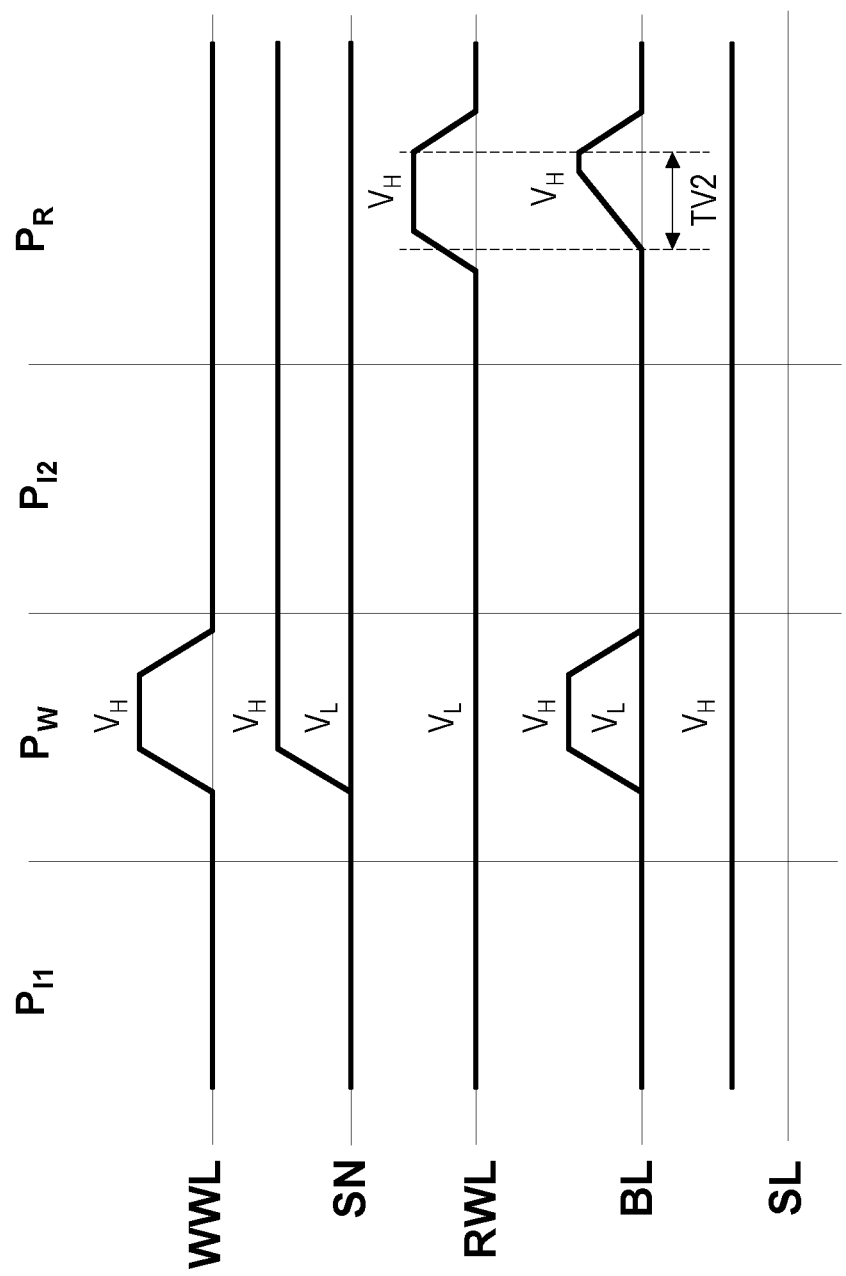
FIG. 2B is a timing diagram illustrating an operation scheme of each memory cell in the memory device shown in FIG. 1, according to some other embodiments of the present disclosure.

FIG. 2B is a timing diagram illustrating an operation scheme of each memory cell MC in the memory device 10, according to some other embodiments of the present disclosure.

Such operation scheme is similar to the operation scheme described with reference to FIG. 2A, except for a few differences. Specifically, according to the operation scheme shown in FIG. 2B, the source line SL remains coupled to the logic high voltage $V_H$, and the bit line BL is not subjected to pre-charging during the read operation $P_R$.

As a result, during the read operation $P_R$ shown in FIG. 2B, the bit line BL is coupled to and charged by the source line SL when the storage transistor ST is turned on as a result that the logic high data "1" corresponding to the logic high voltage $V_H$ was stored at the storage node SN, while is not coupled to the source line SL when the storage transistor ST is kept off as a result that the logic low data "0" corresponding to the logic low voltage $V_L$ was stored at the storage node SN. That is, if the bit line BL is pulled up in the time interval TV2 (in which the read transistor RT is turned on), it can be determined that the storage node SN was programmed with the logic high data "1". On the other hand, if the bit line BL is not charged by the source line SL in the time interval TV2, it can be determined that the storage node SN was programmed with the logic low data "0".

As the read operation $P_R$ shown in FIG. 2B involves charging the bit line BL (if the storage node SN was stored with the logic high data "1"), it can also be referred to as a charge-mode read operation. On the other hand, as the read operation PR shown in FIG. 2A involves discharging the bit line BL (if the storage node SN was stored with the logic high data "1"), it can also be referred to as a discharge-mode read operation.

Further, despite being described according to the embodiments where the write transistor WT, the read transistor RT and the storage transistor ST are respectively implemented by an NMOS, the operation scheme with the charge-mode read operation PR shown in FIG. 2B can also be applied to the embodiments that the write transistor WT, the read transistor RT and the storage transistor ST are respectively formed of a PMOS, if signal polarity is reversed. Also, to ensure that the dummy transistor DT remains off, the gate terminal of the dummy transistor DT may be coupled to the logic low voltage $V_L$ the entire time if the dummy transistor DT is implemented by an NMOS, and may be coupled to the logic high voltage $V_H$ the entire time if the dummy transistor DT is implemented by a PMOS.

In addition to having different operation schemes, the memory device 10 may be formed by various layout designs.

Figure 3A:
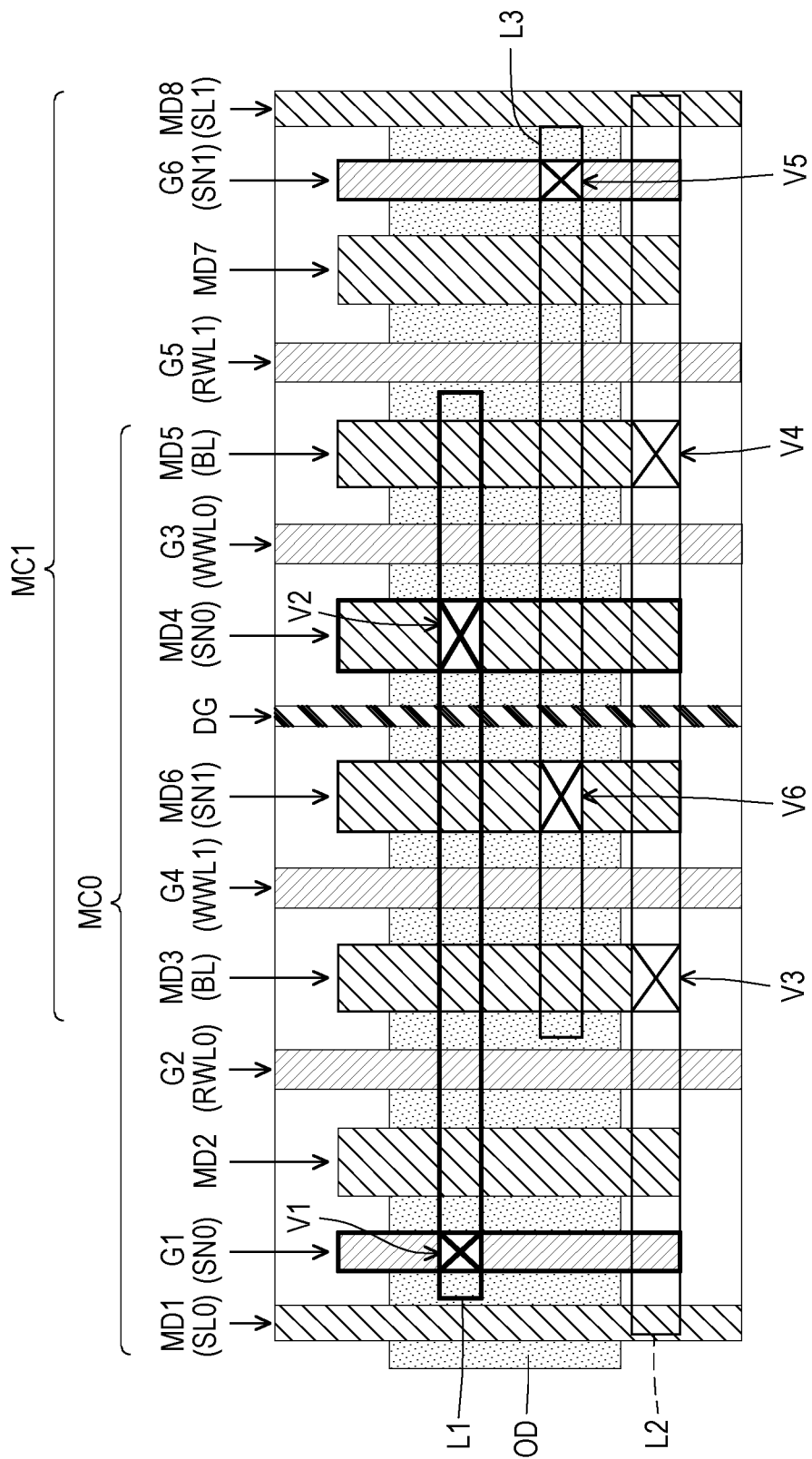
FIG. 3A is a layout diagram illustrating a layout of the neighboring memory cells of the memory device shown in FIG. 1, according to some embodiments of the present disclosure.

FIG. 3A is a layout diagram illustrating a layout of the neighboring memory cells MC0, MC1 of the memory device 10 shown in FIG. 1, according to some embodiments of the present disclosure.

The memory cells MC0, MC1 may be deployed along an active region OD. The active region OD may be defined by a surface region of a semiconductor substrate (not shown) laterally surrounded by a trench isolation structure (also not shown). In some embodiments where each memory cell MC is formed by fin-type MOSFETs (finFETs), the active region OD may be shaped with fin structures at its top surface. In other embodiments where each memory cell MC is formed by gate-all-around MOSFETs (GAAFETs), the active region OD further includes stacks of channel structure formed on the semiconductor substrate. In alternative embodiments where each memory cell MC is formed by planar-type MOSFETs, the active region OD may not be shaped with fin structures, and may not include stacks of channel structures formed on the semiconductor substrate.

The memory cell MC0 includes gate structures G1, G2, G3 and source/drain contacts MD1, MD2, MD3, MD4, MD5 extending along a direction intersecting with an extending direction of the active region OD. The gate structures G1, G2, G3 may be arranged along the active region OD in order. The gate structure G1 is located between the source/drain contacts MD1, MD2; the gate structure G2 is located between the source/drain contacts MD2, MD3; and the gate structure G4 is located between the source/drain contacts MD4, MD5.

Referring to FIG. 1 and FIG. 3A, the storage transistor ST0 is defined in a vicinity where the gate structure G1 and the source/drain contacts MD1, MD2 intersect the active region OD; the read transistor RT0 is defined in a vicinity where the gate structure G2 and the source/drain contacts MD2, MD3 intersect the active region OD, and the write transistor WT0 is defined in a vicinity where the gate structure G3 and the source/drain contacts MD4, MD5 intersect the active region OD. Specifically, the gate structure G1 is functioned as the gate terminal of the storage transistor ST0 as well as a part of the storage node SN0; the gate structure G2 is functioned as the gate terminal of the read transistor RT0 and is served as or connected to the read word line RWL0; and the gate structure G3 is functioned as the gate terminal of the write transistor WT0 and is served as or connected to the write word line WWL0. In addition, the source/drain contact MD1 at one side of the gate structure G1 is functioned as the source/drain terminal of the storage transistor ST0 that is connected to the source line SL0, whereas the source/drain contact MD2 at the other side of the gate structure G1 is functioned as the other source/drain terminal of the storage transistor ST0. Particularly, the source/drain contact MD2 extends in between the gate structures G1, G2, and is functioned as a common source/drain terminal of the storage transistor ST0 and the read transistor RT0. In this way, the source/drain contact MD3 at the other side of the gate structure G2 is functioned as the other source/drain terminal of the read transistor RT0 that is connected to the bit line BL. Further, the source/drain contact MD4 at one side of the gate structure G3 is functioned as one of the source/drain terminals of the write transistor WW0, and is connected to the gate structure G1 to be functioned as another part of the storage node SN0. In addition, the source/drain contact MD5 at the other side of the gate structure G3 is functioned as the other source/drain terminal of the write transistor WT0 that is connected to the bit line BL.

In order to connect the gate structure G1 and the source/drain contact MD4 collectively functioned as the storage node SN0, a conductive line L1 running above and conductive vias V1, V2 connecting the gate structure G1 and the source/drain contact MD4 to the conductive line L1 are disposed. In addition, according to some embodiments, the source/drain contacts MD3, MD5 may be connected to an overlying conductive line L2 functioned as the bit line BL, and conductive vias V3, V4 are used for establishing connection between the source/drain contacts MD3, MD5 and the conductive line L2.

According to some embodiments, the memory cells MC0, MC1 partially overlap with each other, and share some source/drain contacts. In these embodiments, the write transistor WT1 of the memory cell MC1 may be disposed between the read transistor RT0 and the write transistor WT0 of the memory cell MC0, and the source/drain contact MD3 connected to the bit line BL is shared by the read transistor RT0 of the memory cell MC0 and the write transistor WT1 of the memory cell MC1. In addition to using the source/drain contact MD3 as one of the source/drain terminals, the write transistor WT1 includes a gate structure G4 as the gate terminal and a source/drain contact MD6 as the other source/drain terminal. The gate structure G4 is located next to the source/drain contact MD3, and may be served as or connected to the write word line WWL1. While the source/drain contact MD3 is located at a side of the gate structure G4, the source/drain contact MD6 is located at the other side of the gate structure G4, and may be functioned as a part of the storage node SN1 of the memory cell MC1.

In addition, the dummy transistor DT co-defined by the memory cells MC0, MC1 is located in a common area of the memory cells MC0, MC1. As the write transistor WT1 of the memory cell MC1 is located between the read transistor RT0 and the write transistor WT0 of the memory cell MC0, the dummy transistor DT may be defined between the write transistor WT1 of the memory cell MC1 and the write transistor WT0 of the memory cell MC0. Specifically, the dummy transistor DT includes a dummy gate structure DG extending in between the source/drain contacts MD4, MD6, which are functioned as the storage node SN0 of the memory cell MC0 and the storage node SN1 of the memory cell MC1, respectively. While the source/drain contacts MD4, MD6 are served as the source/drain terminals of the dummy transistor DT, the dummy gate structure DG is served as the gate terminal of the dummy transistor DT, which is controlled to ensure that the dummy transistor DT is off and the source/drain contacts MD4, MD6 (i.e., the storage nodes SN0, SN1) can be decoupled from each other.

Further, the other source/drain contact MD5 connected to the bit line BL may be shared with the write transistor WT0 of the memory cell MC0 and the read transistor RT1 of the memory cell MC1. In addition to using the source/drain contact MD5 as one of the source/drain terminals, the read transistor RT1 includes a gate structure G5 as the gate terminal and a source/drain contact MD7 as the other source/drain terminal. The gate structure G5 is located next to the source/drain contact MD5, and may be served as or connected to the read word line RWL1. While the source/drain contact MD5 is located at a side of the gate structure G5, the source/drain contact MD7 is located at the other side of the gate structure G5, and may be shared with the storage transistor ST1 of the memory cell MC1.

On the other hand, as similar to the storage transistor ST0 of the memory cell MC0, the storage transistor ST1 of the memory cell MC1 may be defined in an individual area (not shared by the memory cells MC0, MC1). Specifically, while the source/drain contact MD7 is functioned as the common source/drain terminal of the read transistor RT1 and the storage transistor ST1, the storage transistor ST1 may further include a gate structure G6 as the gate terminal and a source/drain contact MD8 as the other source/drain terminal connected to the source line SL1. The gate structure G6 extends in between the source/drain contacts MD7, MD8, and the gate structure G6 as well as the source/drain contact MD6 (one of the source/drain terminals of the write transistor WT1) are connected to be collectively functioned as the storage node SN1. According to some embodiments, the gate structure G6 and the source/drain contact MD6 are connected through a conductive line SL3, and conductive vias V5, V6 may be used for picking up the gate structure G6 and the source/drain contact MD to the conductive line SL3.

As described, the memory cells MC0, MC1 sharing the dummy transistor DT in between partially overlap with each other. Such partial overlap of the memory cells MC0, MC1 may be resulted from swap of the write transistors WT0, WT1. Otherwise, the storage transistor ST0, the read transistor RT0 and the write transistor WT0 of the memory cell MC0 would be all located at a first side of the dummy gate structure DG of the dummy transistor DT, whereas the storage transistor ST1, the read transistor RT1 and the write transistor WT1 of the memory cell MC1 would be all located at a second side of the dummy gate structure DG of the dummy transistor DT. By swapping the write transistors WT0, WT1, the one of the source/drain terminals of the write transistor WT0 and the gate terminal of the storage transistor ST0 both served as the storage node SN0 can be widely spaced apart from each other. In other words, the source/drain contact MD4 and the gate structure G1 can be sufficiently separated. Therefore, the conductive line L1 connecting the source/drain contact MD4 and the gate structure G1 can have sufficient length to pass design rule check (DRC). Furthermore, as the conductive line L1 is also coupled to the storage node SN0, the equivalent capacitance of the storage capacitors at the storage node SN0 can be raised by increasing the length of the conductive line L1. Therefore, data retention at the storage node SN0 can be enhanced. Similarly, by swapping the write transistors WT0, WT1, the conductive line L3 can be ensured to have sufficient length to pass the DRC, and the data retention at the storage node SN1 can be enhanced.

However, in alternative embodiments, the conductive lines L1, L3 can have sufficient length without swapping the write transistors WT0, WT1.

Figure 3B:
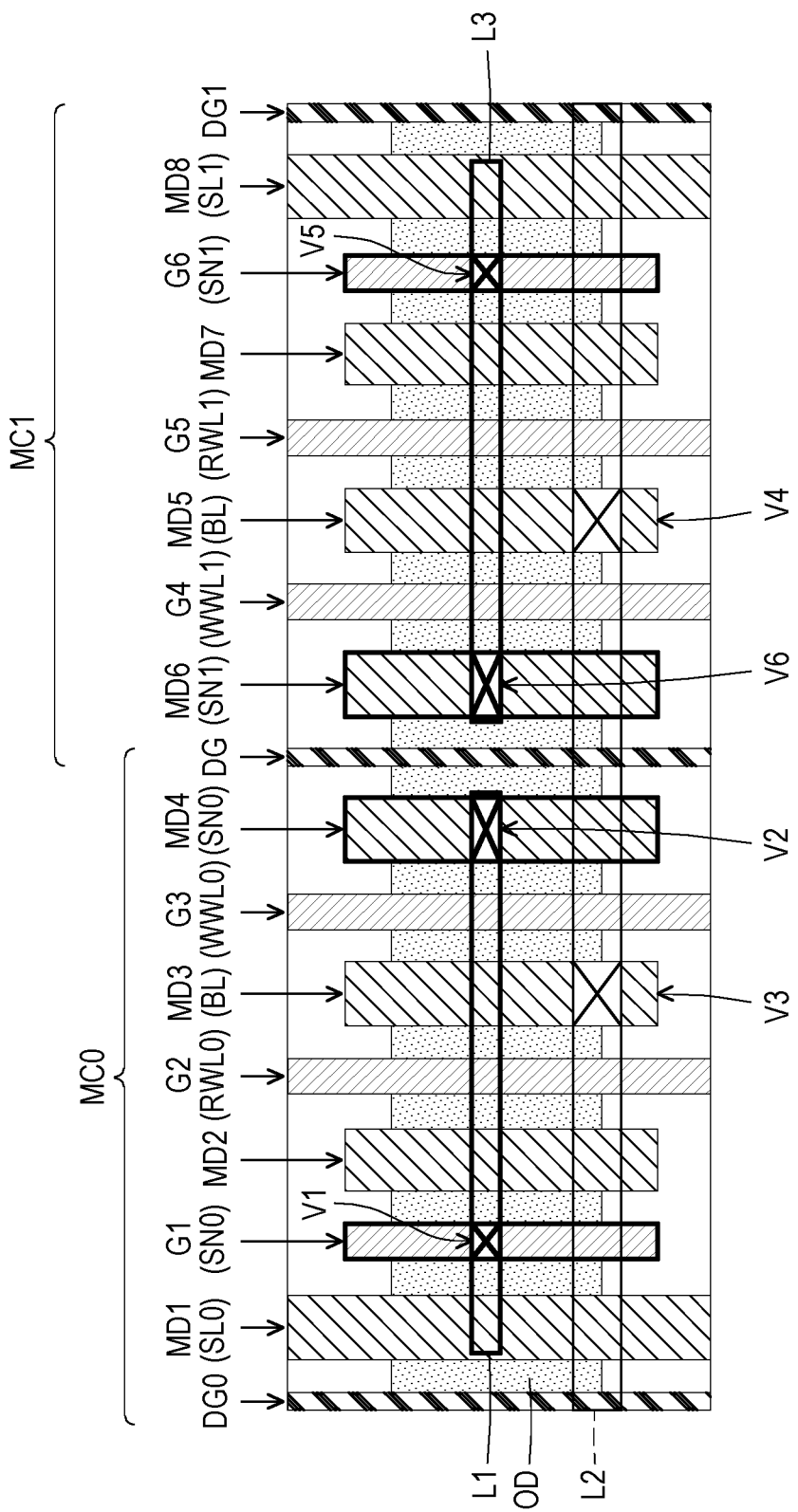
FIG. 3B is a layout diagram illustrating an alternative layout of the neighboring memory cells of the memory device shown in FIG. 1, according to some other embodiments of the present disclosure.

FIG. 3B is a layout diagram illustrating an alternative layout of the neighboring memory cells MC0, MC1 of the memory device 10 shown in FIG. 1, according to some embodiments of the present disclosure.

Such layout is similar to the layout described with reference to FIG. 3A, except for a few differences. According to the layout shown in FIG. 3B, the write transistors WT0, WT1 are not swapped. That is, the write transistor WT0, the read transistor RT0 and the storage transistor ST0 of the memory cell MC0 are disposed at a first side of the dummy gate structure DG of the dummy transistor DT, whereas the write transistor WT1, the read transistor RT1 and the storage transistor ST1 of the memory cell MC1 are disposed at a second side of the dummy gate structure DG of the dummy transistor DT. Specifically, the write transistor WT0 defined by the gate structure G3 and the source/drain contacts MD3, MD4 is disposed between the dummy gate structure DG of the dummy transistor DT and the read transistor RT0 sharing the source/drain contact MD3 with the write transistor WT0 and having the gate structure G2 and the source/drain contact MD2 as the gate terminal and the other source/drain terminal. In addition, the write transistor WT1 defined by the gate structure G4 and the source/drain contacts MD5, MD6 is disposed between the dummy gate structure DG of the dummy transistor DT and the read transistor RT1 sharing the source/drain contact MD5 with the write transistor WT1 and having the gate structure G5 and the source/drain contact MD7 as the gate terminal and the other source/drain terminal.

In this way, a spacing between the gate structure G1 and the source/drain contact MD4 both served as the storage node SN0 is shortened. In order to ensure that the conductive line L1 connecting the gate structure G1 and the source/drain contact MD4 still has sufficient length to pass the DRC and to ensure promising data retention at the storage node SN0, the conductive line L1 may further extend to overlap the source/drain contact MD1 connected to the source line SL0. Correspondingly, the source/drain contact MD1 may be avoided from being shared with an adjacent memory cell (not shown), to prevent the conductive line L1 from accidentally extending to the adjacent memory cell. According to some embodiments, a dummy gate structure DG0 is further disposed along an edge of the memory cell MC0, to ensure that the conductive line L1 can be terminated within the memory cell MC0. In these embodiments, the source/drain contact MD1 is located between the gate structure G1 and the dummy gate structure DG0, and the memory cell MC0 further spans to the dummy gate structure DG0.

Similarly, in order to ensure that the conductive line L3 connecting the gate structure G6 and the source/drain contact MD6 (both served as the storage node SN1) still has sufficient length to pass the DRC and to ensure promising data retention at the storage node SN1, the conductive line L3 may further extend to overlap the source/drain contact MD8 connected to the source line SL1. Correspondingly, the source/drain contact MD8 may be avoided from being shared with an adjacent memory cell (not shown), to prevent the conductive line L3 from accidentally extending to the adjacent memory cell. According to some embodiments, a dummy gate structure DG1 is further disposed along an edge of the memory cell MC1, to ensure that the conductive line L3 can be terminated within the memory cell MC1. In these embodiments, the source/drain contact MD8 is located between the gate structure G6 and the dummy gate structure DG1, and the memory cell MC1 further spans to the dummy gate structure DG1.

In the embodiments described above, the storage transistor ST, the read transistor RT and the write transistor WT in each memory cell MC are arranged along a single row. In alternative embodiments, each memory cell MC is arranged along multiple rows.

FIG. 3C is a layout diagram illustrating an alternative layout of the neighboring memory cells MC0, MC1 of the memory device 10 shown in FIG. 1, according to some embodiments of the present disclosure.

Referring to FIG. 3C, according to some embodiments, the memory cells MC0, MC1 are arranged along active regions OD1, OD2. The active regions OD1, OD2 are laterally separated from each other, and each similar to the active region OD as described with reference to FIG. 3A. The storage transistor ST and the read transistor RT in each memory cell MC are defined along the active region OD1, whereas the write transistor WT in each memory cell MC is defined within the active region OD2.

Specifically, the memory cell MC0 may include gate structures GS0, GW0, GR0 and source/drain contacts MDa, MDb, MDc, MDd. The gate structure GS0 extending across the active region OD1 is functioned as the gate terminal of the storage transistor ST0 as well as a part of the storage node SN0. In addition, the source/drain contacts MDa, MDb intersecting the active region OD1 are disposed at opposite sides of the gate structure GS0, and are functioned as the source/drain terminals of the storage transistor ST0. The source/drain contact MDa may be connected to the source line SL0, whereas the source/drain contact MDb may be shared by the storage transistor ST0 and the read transistor RT0. While having the source/drain contact MDb as one of the source/drain terminals, the read transistor RT0 also includes the gate structure GR0 as the gate terminal and the source/drain contact MDc as the other source/drain terminal that is connected to the bit line BL. Since the gate structure GR0 and the source/drain contacts MDb, MDc respectively extend across the active region OD1, the read transistor RT0 is defined within the active region OD1, as similar to the storage transistor ST0.

In addition to intersecting the active region OD1, the source/drain contact MDc may further extend across the active region OD2, to be shared with the write transistor WT0 defined within the active region OD2. While having the source/drain contact MDc as one of the source/drain terminals, the write transistor WT0 also includes the gate structure GW0 as the gate terminal and the source/drain contact MDd as the other source/drain terminal. The gate structure GW0 intersects the active region OD2, but does not extend to the active region OD1. In some embodiments, the gate structure GW0 is positioned in alignment with the gate structure GR0 as the gate terminal of the read transistor RT0. As the source/drain contact MDc at one side of the gate structure GW0 is connected to the bit line BL, the source/drain contact MDd at the other side of the gate structure GW0 is provided as the other source/drain terminal of the write transistor WT0, and is functioned as another part of the storage node SN0. In this way, the source/drain contact MDd and the gate structure MS0 both serve as the storage node SN0. Although not shown, a conductive line may be deployed for connecting the source/drain contact MDd and the gate structure GS0, and conductive vias may be used for routing the source/drain contact MDd and the gate structure GS0 to this conductive line. Further, in some embodiments, the source/drain contact MDd may be positioned in alignment with the source/drain contact MDb.

According to some embodiments, the gate structure GS0 as the gate terminal of the storage transistor ST0 and a part of the storage node SN0 further extends to cross the active region OD2. As the storage node SN0 has a greater length, capacitance at the storage node SN0 may be increased, and data retention at the storage node SN0 may be enhanced. In these embodiments, while the source/drain contact MDd is located at a side of the extending section of the gate structure GS0, a dummy source/drain contact MDe may intersect the active region OD2 at the other side of the extending section of the gate structure GS0. By disposing the dummy source/drain contact MDe, layout of the memory cell MC0 can be in mirror symmetry with respect to an imaginary central line extending in between the active regions OD1, OD2. It should be appreciated that, to fulfill the mirror symmetry, the dummy source/drain contact MDe may be positioned in alignment with the source/drain contact MDa at the same side of the gate structure GS0 as the dummy source/drain contact MDe.

Further, in some embodiments, the source/drain contact MDa and the dummy source/drain contact MDe are located between the gate structure GS0 and a dummy gate structure DG0 both extending across the active regions OD1, OD2. In these embodiments, the dummy gate structure DG0 defines an edge of the memory cell MC0, whereas the source/drain contact MDc connected to the bit line BL defines another edge of the memory cell MC0 that is shared with the memory cell MC1.

As similar to the memory cell MC0, the memory cell MC1 is arranged along the separate active regions OD1, OD2. According to some embodiments, the memory cells MC0, MC1 are in mirror symmetry with respect to the common source/drain contact MDc disposed along the shared boundary of the memory cells MC0, MC1.

Specifically, the memory cell MC1 may include gate structures GR1, GS1 and source/drain contacts MDf, MDg. The gate structure GR1, the source/drain contact MDf, the gate structure GS1 and the source/drain contact MDg intersecting the active region OD1 may be arranged in order along a lateral direction away from the source/drain contact MDc shared by the memory cells MC0, MC1, to define the read transistor RT1 and the storage transistor ST1. The gate structure GR1 is functioned as the gate terminal of the read transistor RT1, and is connected to the read word line RWL. While the source/drain contact MDe connected to the bit line BL is functioned as one of the source/drain terminals of the read transistor RT1, the source/drain contact MDf is provided as a common source/drain terminal of the read transistor RT1 and the storage transistor ST1. In addition, the gate structure GS1 aside the source/drain contact MDf is functioned as the gate terminal of the storage transistor ST1, and is functioned as a part of the storage node SN1. As the source/drain contact MDf is provided as one of the source/drain terminals of the storage transistor ST1, the source/drain contact MDg is served as the other source/drain terminal of the storage transistor ST1, and is connected to the source line SL1.

Further, the memory cells MC1 also includes a gate structure GW1 and a source/drain contact MDh intersecting the active region OD2. The gate structure GW1 is located between the source/drain contact MDh and the source/drain contact MDc connected to the bit line BL, and is functioned as the gate terminal of the write transistor WT1. While the source/drain contact MDc connected to the bit line BL is provided as one of the source/drain terminals of the write transistor WT1, the source/drain contact MDh is provided as the other source/drain terminal of the write transistor WT1, and is functioned as another part of the storage node SN1. That is, the gate structure GS1 as the gate terminal of the storage transistor ST1 and the source/drain contact MDh as one of the source/drain terminals of the write transistor WT1 are both served as the storage node SN1. Although not shown, a conductive line may be deployed for connecting the source/drain contact MDf and the gate structure GS1, and conductive vias may be used for routing the source/drain contact MDf and the gate structure GS1 to this conductive line.

In some embodiments, the gate structure GS1 further intersects the active region OD2, to enhance data retention at the storage node SN1. In these embodiments, a section of the gate structure GS1 crossing the active region OD1 is located between the source/drain contacts MDf, MDG, and another section of the gate structure GS1 crossing the active region OD2 is laterally adjacent to the source/drain contact MDh by a first side. In order to achieve symmetrical arrangement, a dummy source/drain contact MDi intersecting the active region OD2 may be further disposed at a second side of the section of the gate structure GS1 crossing the active region OD2.

Further, in some embodiments, the source/drain contact MDg and the dummy source/drain contact MDi are located between the gate structure GS1 and a dummy gate structure DG1 both extending across the active regions OD1, OD2. In these embodiments, the dummy gate structure DG1 defines an edge of the memory cell MC1, whereas the source/drain contact MDc connected to the bit line BL defines another edge of the memory cell MC1 that is shared with the memory cell MC0.

Despite that the dummy transistor DT with the storage nodes SN0, SN1 as its source/drain terminals is absent in the layout shown in FIG. 3C, the gate structures GS0, GS1 served as the storage nodes SN0, SN1 in such layout further elongates to cross over the active regions OD1, OD2, thus data retention at the storage nodes SN0, SN1 can be enhanced as well.

As above, a memory device as well as operation methods and layout designs for the memory device are provided. Each memory cell in the memory device is formed of interconnected write transistor, read transistor and storage transistor. This allows the memory device to be logic compatible, and can be arranged close to logic circuits. As compared to SRAM that usually includes 6 or more transistors in each cell, the memory device has much less transistors in each cell. Therefore, layout design of the memory device is more flexible. In certain cases, logic circuits and the memory device can share the same design rule, and a dummy region in between can be omitted. Accordingly, valuable chip area can be released. Further, data written to a storage node in each memory cell of the memory device can be non-destructively read out by sensing if a current is driven along a bit line by the storage node. Moreover, writing and reading of each memory cell in the memory device can be operated by using the same bit line, thus circuit and layout of the memory device can be further simplified. According to some embodiments, adjacent memory cells in the memory device share a dummy transistor in between. The storage nodes of the memory cells are provided as source/drain terminals of the dummy transistor. In this way, a gate capacitor of the dummy transistor can be served as an additional storage capacitors at the storage nodes, thus data retention at the storage nodes can be enhanced.

In an aspect of the present disclosure, a memory device is provided. The memory device comprises: a write transistor, with a gate terminal connected to a write word line, wherein a first source/drain terminal of the write transistor is connected to a bit line; a storage transistor, with a gate terminal coupled to a second source/drain terminal of the write transistor to form a storage node, wherein a first source/drain terminal of the storage transistor is connected to a source line; and a read transistor, with a gate terminal coupled to a read word line, wherein a first source/drain terminal of the read transistor is connected to the bit line, and wherein the read transistor and the storage transistor share a second source/drain terminal.

In another aspect of the present disclosure, a memory device is provided. The memory device comprises: a first memory cell, formed by interconnected first write transistor, first read transistor and first storage transistor, wherein a source/drain terminal of the first write transistor is connected to a gate terminal of the first storage transistor to form a first storage node; a second memory cell, formed by interconnected second write transistor, second read transistor and second storage transistor, wherein a source/drain terminal of the second write transistor is connected to a gate terminal of the second storage transistor to form a second storage node; and a dummy transistor, shared by the first and second memory cells, wherein the first and second storage nodes are provided as source/drain terminals of the dummy transistor, and are decoupled from each other as the dummy transistor is kept off.

In yet another aspect of the present disclosure, a memory device is provided. The memory device comprises: a write transistor, a read transistor and a storage transistor, interconnected with one another, wherein a source/drain terminal of the write transistor is connected to a gate terminal of the storage transistor to form a storage node, the storage transistor and the read transistor are defined along a first active region of a semiconductor substrate, the write transistor is defined on a second active region of the semiconductor substrate, the first and second active region both extend along a first lateral direction, and are separated from each other in a second lateral direction intersected with the first lateral direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a write transistor, with a gate terminal connected to a write word line, wherein a first source/drain terminal of the write transistor is connected to a bit line;
a storage transistor, with a gate terminal coupled to a second source/drain terminal of the write transistor to form a storage node, wherein a first source/drain terminal of the storage transistor is connected to a source line; and
a read transistor, with a gate terminal coupled to a read word line, wherein a first source/drain terminal of the read transistor is connected to the bit line, and wherein the read transistor and the storage transistor share a second source/drain terminal.

2. The memory device according to claim 1, wherein the storage node is coupled to a reference voltage through a gate capacitor of a dummy transistor.

3. The memory device according to claim 2, wherein the storage node is provided as a source/drain terminal of the dummy transistor, and the reference voltage is coupled to a gate terminal of the dummy transistor.

4. The memory device according to claim 1, wherein the write transistor, the storage transistor and the read transistor are laid side-by-side along a single row on a semiconductor substrate.

5. The memory device according to claim 4, wherein the read transistor is laid between the storage transistor and the write transistor.

6. The memory device according to claim 5, further comprising a dummy transistor with a source/drain terminal provided by the storage node, wherein the dummy transistor is laid between the read transistor and the write transistor.

7. The memory device according to claim 5, further comprising a dummy transistor with a source/drain terminal provided by the storage node, wherein the storage transistor, the read transistor, the write transistor and the dummy transistor are laid in order along the row.

8. The memory device according to claim 1, wherein the write transistor, the storage transistor and the read transistor are laid along separate rows on a semiconductor substrate.

9. The memory device according to claim 8, wherein the storage transistor and the read transistor are laid along a first row, and the write transistor is laid in a second row separated from the first row.

10. A memory device, comprising:
- a first memory cell and a second memory cell, wherein the first memory cell and a second memory cell are coupled with each other through a dummy transistor, and each of the first memory cell and the second memory cell comprises:
- a write transistor, with a gate terminal connected to a write word line, wherein a first source/drain terminal of the write transistor is connected to a bit line;
- a storage transistor, with a gate terminal coupled to a second source/drain terminal of the write transistor to form a storage node, wherein a first source/drain terminal of the storage transistor is connected to a source line; and
- a read transistor, with a gate terminal coupled to a read word line, wherein a first source/drain terminal of the read transistor is connected to the bit line, and wherein the read transistor and the storage transistor share a second source/drain terminal.

11. The memory device according to claim 10, wherein the storage node of each of the first memory cell and the second memory cell is coupled to a reference voltage through a gate capacitor of a dummy transistor.

12. The memory device according to claim 11, wherein the storage node of each of the first memory cell and the second memory cell is provided as a source/drain terminal of the dummy transistor, and the reference voltage is coupled to a gate terminal of the dummy transistor.

13. The memory device according to claim 10, wherein the write transistor, the storage transistor and the read transistor of each of the first memory cell and the second memory cell are laid side-by-side along a single row on a semiconductor substrate.

14. The memory device according to claim 13, wherein the read transistor of each of the first memory cell and the second memory cell is laid between the storage transistor and the write transistor.

15. The memory device according to claim 14, wherein a first end of the dummy transistor is coupled to a coupling end of the read transistor and the write transistor of the first memory cell, and a second end of the dummy transistor is coupled to a coupling end of the read transistor and the write transistor of the second memory cell.

16. The memory device according to claim 14, wherein the storage transistor, the read transistor, the write transistor of one of the first memory cell and the second memory cell are laid in order along the row with the dummy transistor.

17. The memory device according to claim 10, wherein the write transistor, the storage transistor and the read transistor of each of the first memory cell and the second memory cell are laid along separate rows on a semiconductor substrate.

18. An operation method of a memory device, comprising:
- providing a write transistor having a gate terminal connected to a write word line for receiving a first active logic voltage to perform a writing operation, and connecting a bit line to a first source/drain terminal of the write transistor;
- providing a storage transistor having a gate terminal to form a storage node coupled to a second source/drain terminal of the write transistor, and connecting a source line to a first source/drain terminal of the storage transistor; and
- providing a read transistor having a gate terminal coupled to a read word line for receiving a second active logic voltage to perform a reading operation, and connecting a source line to a first source/drain terminal of the read transistor; and
- connecting a second source/drain terminal of the storage transistor with a second source/drain terminal of the read transistor to form a read path during the reading operation.

19. The operation method of a memory device according to claim 18, further comprising:
- cutting off the read transistor and the write transistor during an idle phase.

* * * * *